United States Patent [19]

Adams

[11] Patent Number: 4,740,900

[45] Date of Patent: Apr. 26, 1988

[54] DEVICE FOR THE IDENTIFICATION OF AN EFFECTIVE TARIFF IN A SERIAL SELECTION OF TARIFF LEVELS

[75] Inventor: Jürgen Adams, Villingen-Schwenningen, Fed. Rep. of Germany

[73] Assignee: Mannesmann Kienzle GmbH, Fed. Rep. of Germany

[21] Appl. No.: 794,225

[22] Filed: Nov. 1, 1985

[30] Foreign Application Priority Data

Nov. 8, 1984 [DE] Fed. Rep. of Germany ....... 3440798

[51] Int. Cl.⁴ .................... G07B 13/00; G07B 13/08
[52] U.S. Cl. .................................. 364/467; 235/30 R
[58] Field of Search ................. 364/467, 464, 478; 235/30 R, 33

[56] References Cited

U.S. PATENT DOCUMENTS

| | | | |
|---|---|---|---|
| 3,970,827 | 7/1976 | Ikuta et al. ........................ | 364/467 |
| 4,001,560 | 1/1977 | Larsen ............................... | 364/467 |
| 4,081,663 | 3/1978 | Ahlberg ............................. | 364/467 |
| 4,167,040 | 9/1979 | Heritier et al. .................... | 364/467 |
| 4,409,685 | 10/1983 | Ricard ................................ | 364/467 |
| 4,482,965 | 11/1984 | Tateishi et al. .................... | 364/467 |
| 4,539,644 | 9/1985 | Adams et al. ..................... | 364/467 |
| 4,578,760 | 3/1986 | Adams et al. ..................... | 364/467 |

FOREIGN PATENT DOCUMENTS

| | | | |
|---|---|---|---|
| 0079401 | 5/1983 | European Pat. Off. ............ | 364/467 |
| 2608251 | 9/1977 | Fed. Rep. of Germany . | |
| 3440798 | 11/1984 | Fed. Rep. of Germany . | |
| 2076203 | 11/1981 | United Kingdom . | |
| 2076200 | 11/1981 | United Kingdom . | |

*Primary Examiner*—Parshotam S. Lall
*Assistant Examiner*—Daniel W. Juffernbruch
*Attorney, Agent, or Firm*—Toren, McGeady & Associates

[57] ABSTRACT

An arrangement is described for the selection of a tariff level "n" by repeated actuation of a key T1 or T2, which can be actuated in series, whereby the desired tariff level is adjustable by forward switching or reverse switching. Each selected tariff level is displayed immediately after detecting the key actuation by an allocation sentinel (27) in a display (10), and the start of a waiting time, which can be preset, can be triggered in each tariff selection. After the expiration of the waiting time, a parameter assigned to the last selected tariff level appears in the fare display field (26) and, accordingly, signals the acceptance of the last selected tariff level including the activation of all of the rest of the parameters assignable to the selected tariff level. It is possible, thereby, to select a tariff level by skipping over undesired tariff levels without the fare display being changed during the selection process.

5 Claims, 3 Drawing Sheets

DEVICE FOR THE IDENTIFICATION OF AN EFFECTIVE TARIFF IN A SERIAL SELECTION OF TARIFF LEVELS

BACKGROUND OF THE INVENTION

1. Field of the Invention

The invention is directed to an arrangement for switching on tariff levels with independent parameters, particularly in the form of different base amounts, by means of operating keys of an electronic taximeter.

2. Description of Related Art

A taximeter device is used, as known, for calculating fares from the services that ae furnished by the taxi vehicle on the basis of a driving commission. In order to determine a fare which is extensively appropriate to the service, it is necessary to design a tariff structure which takes into account, as far as possible, all circumstances that occur and which is based on the application of highly subdividable parameters. Thus, there are requirements, particularly in an electronic taximeter, to introduce an almost unlimited diversification into the fare calculation procedure from the elements making up the fare calculation as distance and time portions. Nevertheless, certain basic features from the epoch of mechanical taximeters are still contained in the structure of the tariff system. Accordingly, the use of four different tariff or tax levels was adopted in the introduction of most electronic taximeters and supplemented by expansion capabilities brought about through technology. Whereas in the mechanical devices it is still usually a matter of selecting the four tariff levels in a stepwise manner by means of a mechanical selector shaft or selecting each tariff individually by means of separate operating keys accompanied by switching on measures which block manipulation through the operator part, it is possible with the devices which are technologically constructed with microprocessors, to structure the tariff selection at a comparably lower cost by assigning permanently selected parameters. Accordingly, it has proved advantageous, with respect to expenditure on operating elements, to have a sequential selection of tariff levels in taximeters with a plurality of tariff levels. For operation, in standard taxi operation essentially two tariff selecting keys T1 and T2 are provided, by means of which the available tariff levels are selectable in dependence on a program sequence stored in an internal memory (ROM) for controlling the taximeter functions. In a standard programming of the taximeter, for example, the tariff selecting key T1 is assigned a switching sequence by means of which, through a kind of forward switching, the taximeter is switchable in a sequence through the tariff levels I to IV from a "FREE" state to "CASHIER" and "FREE". The second tariff selecting key T2 makes possible a reverse switching within the tariff levels IV to I in a standard programming in the OCCUPIED state. As known, a permanently determined so-called "base amount" is displayed immediately when the taximeter is turned on, in agreement with the tariff structure. As long as there were no large parameter differences in the individual tariff levels, i.e., as long as identical base amounts appeared in the display, in particular, the selection of a tariff level was unproblematic with respect to the "number games" on the fare display. With the increasing prevalence of larger parameter differences, such as various base amounts in the individual tax levels, differences between the initial distances covered and increment distance ratios, as well as differences in the control functions assigned to the tax level, misinterpretations of the fare and overlapping of functions in the tariff level selection can occur. For example, when the taximeter is changed from the "FREE" position to the tax level "III", wherein different base amounts are preset in the tax levels I, II and III, a different amount, which often increases by large steps, appears on the fare display during each selecting step. This display behavior can lead to misunderstandings on the part of the passenger, although the device is being operated in accordance with regulations.

The device behaves in a comparable manner when the rest of the parameters are applied. The calculation of automatic counters, for example, such as are used for the automatic tariff switchovers of "n" forward switchings, can run incorrectly when values are given for the desired function which are incompatible for the automatic counters in the tax levels which are to be skipped over during selection, for example, when changing from tax level I to tax level IV by means of actuating the operating key.

It is the object of the invention to provide a switching arrangement for the operation of the tariff level selection, by means of which the selected tariff level is identifiable in the display at all times and ambiguities in the fare display, during a tariff level selection process and overlapping of functions with respect to the tariff parameters in the individual tariff levels during the tariff level selection, are prevented.

SUMMARY OF THE INVENTION

The solution to this task is characterized in that a sequential selection of a desired tariff level can be initiated by means of a key T1, T2 which can be actuated in series, wherein the respective tariff level selection is identifiably displayed in a display directly in the form of an allocation sentinel; in that the running time of a presettable waiting time can be triggered with the selection of a tariff level; and in that after the expiration of the waiting time a parameter assigned to the selected tariff level appears in the fare display field in the form of an amount for the definition of an acceptance of the selected tariff level; and in that all remaining parameters assigned to the selected tariff level accordingly become active.

The advantage of the invention is obviously recognizable in the functioning of the display. If a key T1 or T2 is actuated one or more times in order to select a determined tariff level, that is, in order to switch on the taximeter, in order to switch forward or in reverse into one of the, for example, four tariff levels, then the allocation sentinel of the tariff level assigned to the last completed key actuation appears immediately in the display. If one desires, for example, to switch from the function position "FREE" to the tariff level III, then key T1, for example, must be actuated three times in sequence if another sequence of the tariff level selection is not preset by means of a particular function program. Immediately after recognizing the key actuation the display of the accordingly selected tariff level is effected; this can occur, for example, in that the figures "1", "2", "3" appear in the display field for the tariff selection in the same sequence as symbols for the acceptance of the key actuations in terms of switching technology. In addition, during each actuation of a tariff selection within a preset waiting time there results a recommencement of the running time of the waiting time phase. Assuming that a direct-selection is effected over two or three tariff levels, it is sufficient, on the basis of the respective recommencement of the running time, to preset a waiting time approximately in the range of several seconds. Only after the expiration of the waiting time, which follows upon the last detected tariff selection, does the base amount appear which is assigned to this tariff level, and the parameters assigned to this tariff level simultaneously become valid or active, respectively. This arrangement makes it possible to select a tariff level by "skipping over" undesired tariff levels without the fare display being changed during the selecting process. Thus, no change takes place within the waiting time phases with respect to the display of parameters in the fare display field, and this display behavior, particularly in a sequential through-switching to a higher tariff level, prevents the passenger from thinking that an increased base amount was adjusted possibly through manipulation through actuation of the keys. Moreover, an information is filed in a system memory (ROM) within a function program of the individual steps, according to which information a limiting of the selection cycles is adjustable in a taximeter with, for example, four tariff levels. Within the time delay of a display of a base amount a tariff level selection can only be carried out four times, after which the tariff selection process is compulsorily interrupted and the base amount of the last selected tariff level appears on the display. Such a limiting of the selection cycles has the advantage that the attempt of a manipulative influencing of the tariff selection process is compulsorily interrupted after the quantity of selectable tariff levels is run through.

In the following, an embodiment example of the switching arrangement, according to the invention, is described with the aid of the drawings.

BRIEF DESCRIPTON OF THE DRAWINGS

DESCRIPTION OF THE PREFERRED EMBODIMENTS

A taximeter of the aforementioned type is used, as is known, for calculating a fare from the services of a driving commission by a taxi vehicle. Bases for the calculation of a fare are distance and/or time elements which occur from the beginning of the driving commission to the end and which result in the fare to be paid which is multiplied by a factor and is shown in the display. In order to guarantee that the payment be determined in conformity with the services in dependence on place and time, a plurality of selectable tariffs are accordingly provided in the taximeter, wherein socalled parameters, which are fixed by means of local considerations, are assignable to each tariff. Of course, the parameters must also be alterable in order, after a certain period of validity, to adapt the receipts to an altered wage or cost situation, for example, through an improved base of the parameters.

Figure 1:
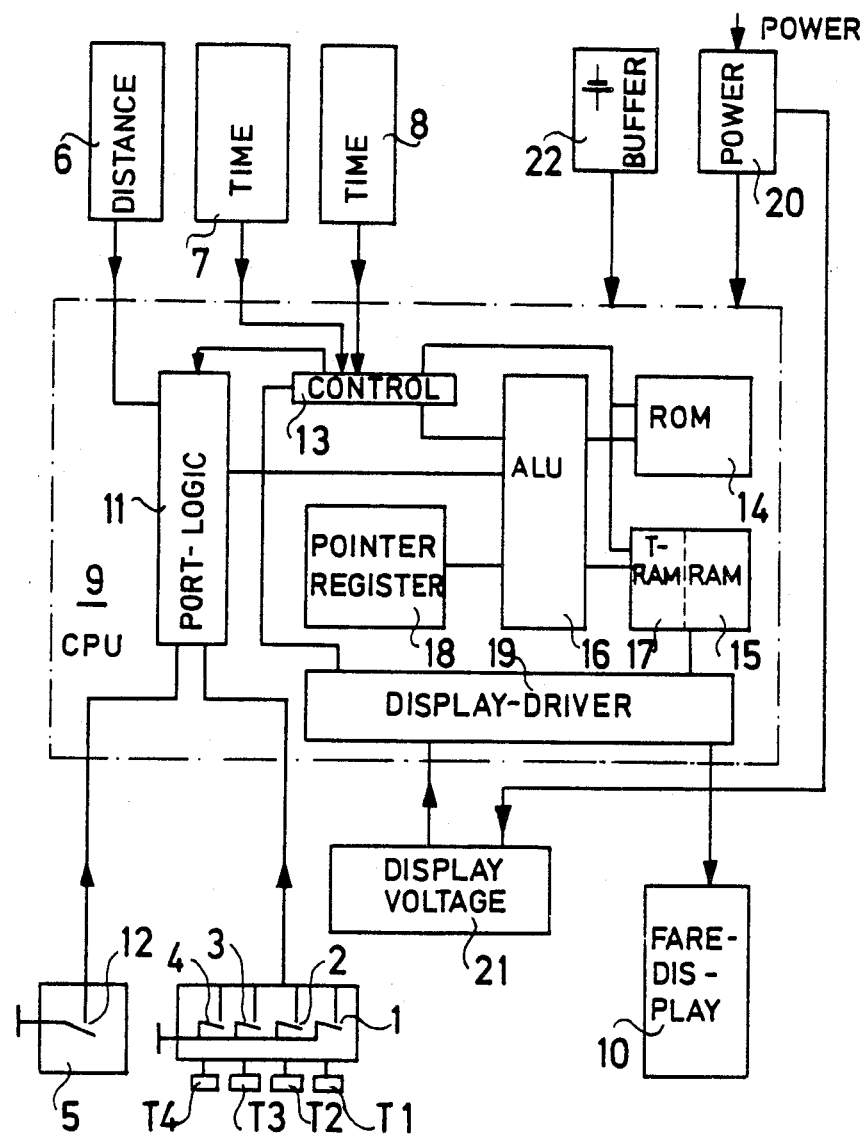
FIG. 1 shows a block diagram of a taximeter with a schematic depiction of the particularities connected substantially with the realization of the invention.
Figure 3:
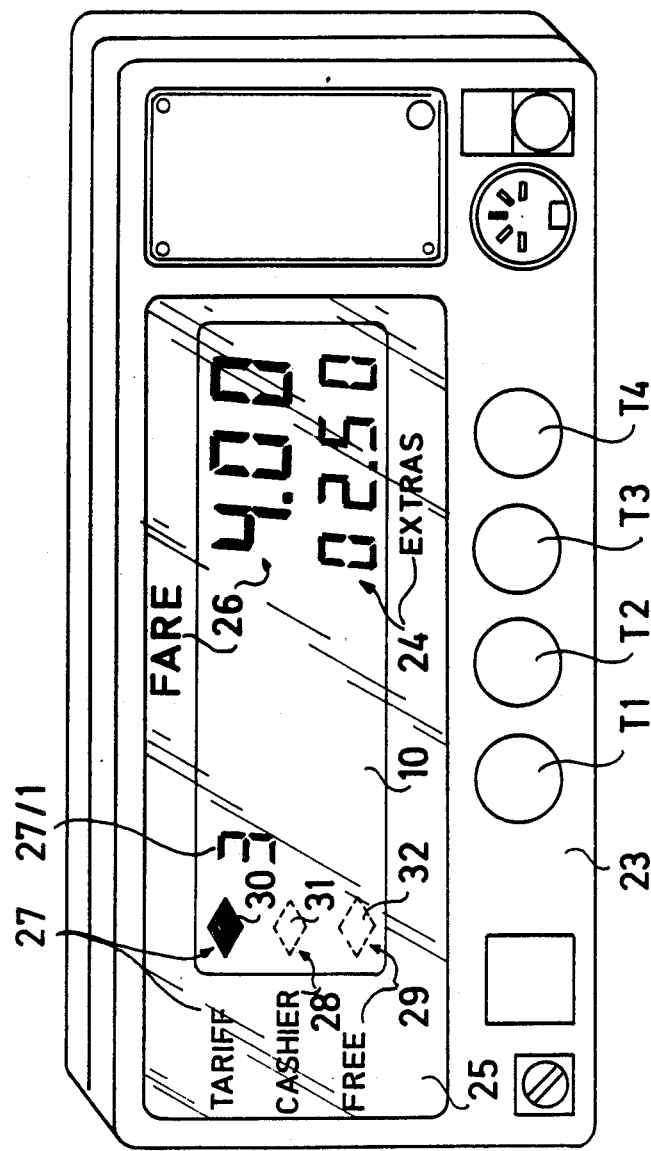
FIG. 3 shows a front view of the taximeter comprising the display, the operating elements and the allocation sentinels appearing in the display during a tariff selection, including the base amount which can be superimposed with time delay.

In adapting to these manifold requirements and to the change of available technologies, the formerly mechanical taximeter device has developed into a specified microprocessor of a particular character, particularly for the determination of fare data in the motor vehicle. Accordingly, a taximeter of the type explained consists, as can be seen from the block diagram according to FIG. 1, of switch elements 1 to 5 for the switching on and switching over functions, which can be triggered manually, signal input elements 6, 7 and 8 relating to service for distance and display signals, a central unit CPU 9 for determining and storing the tax data and, finally, a data output consisting substantially of a fare display 10, possibly with interfaces for the connection of peripheral devices. As can be seen in FIGS. 1 and 3, the manually triggerable functions are constructed as keys T1, T2, T3, T4 which act correspondingly on switches 1, 2, 3, 4 and, when the latter are actuated, introduce a signal in each instance into a port logic 11 as part of the CPU 9, wherein the port logic 11 is to be regarded as a type of intermediate memory. Also connected with the port logic 11 is a manually actuable changeover switch 12 which, in the normal position, moves the device into the state of tax operation and, when shifted into the second position, moves the device into a state for receiving service programs, such as distance adaptation or tariff programming and the like. A distance transmitter 6 and a time transmitter 7 are provided as signal input elements related to service, wherein the distance transmitter 6 is likewise connected with the port logic 11 and supplies signals representing the distance covered. The time transmitter 7, designed, for example, as a quartz oscillator, determines control times of the system, such as display-multiplex signals, working cycle times of the operating processes, etc., and, not least, the tariff times are derived from the time transmitter 7. The time transmitter 7 is connected with a control mechanism 13 which is shown as a part of the CPU 9. Another time transmitter 8, constructed, for example, as a RC oscillator, serves to determine the clock rate of the microprocessor and is likewise connected with the control mechanism 13. The control mechanism 13, as an integrated component part of the CPU 9, is connected with the port logic 11 via internal line connections, as well as with a ROM 14 (read-only memory), a RAM 15 (random access memory) and with an arithmetic unit or ALU 16 (arithmetic logic unit) of the CPU 9 via additional data lines. The ROM 14 fulfills the function of a system memory, i.e. on the basis of a determined key actuation and proceeding from a determined function position, the system program filed in the ROM 14 determines the function steps assigned to the key actuation. Finally, in order to realize a manner of operation which is adjustable to the specific requirements of the user, a programmable memory part is provided in the RAM 17 or T-RAM 17, in addition to the system memory ROM 14, in which are filed primarily the parameters assignable to the different tariffs, but where determined informations influencing the function cycle can also be filed. This means that on the basis of a key information a function position filed together with the respective tariff data in the T-RAM 17 can be assigned or can become active, respectively. The RAM 15 is a necessary component part of a CPU 9 and functions as write and read memory or as working memory, wherein this memory serves, in conjunction with the ALU 16, for example in computational operations, as a temporary storage or depositing place for intermediate results and the like. Correspondingly, the RAM 15 is internally connected with the ALU 16 and the control mechanism 13. A pointer register 18 likewise cooperates internally with the ALU 16 and is used substantially for addressing a connected memory area in that it is incremented or decremented.

As can be seen further from FIG. 1, a display driver 19 obtains the data from the RAM 15 determined for display and acts upon the display elements of the fare display 10 in the multiplexing process. The display driver 19 obtains additional instructions via a connection to the control mechanism 13. The fare display 10 or the numerical display, respectively, is constructed as a multiple-digit decimal display, wherein the individual figures can be shown by means of corresponding control of a 7-segment arrangement.

Finally, a power supply module 20, which is suitable for operation in the motor vehicle, is required for the voltage supply and supplies the system voltage for the CPU 9 and the display voltages via another module 21. A buffer battery 22, for example, a lithium cell, is provided for data buffering during failure or when operating voltage is switched off.

FIG. 3 is a perspective view of the taximeter device with an essentially front view, including the fare display 10. Keys T1, T2, T3, T4 are provided in the lower part of a front housing 23 and serve to trigger the different functions for the tax operation, as wel as to carry out certain service programs. The device which is shown in accordance with the description is a taximeter of the common construction form comprising four available different tariff levels, wherein the scope of the applicable tariffs can be expanded or limited to n tariff levels within certain frameworks and on the basis of the flexible technology. The keys T1, T2 are constructed as simple keys which can be operated in series and are selected in the embodiment example for triggering a sequential selection of a desired tariff level. In principle, an entire series of different functions can be triggered with each key T1 to T4 on the basis of a system program filed in the ROM 14. In a standard programming the key T1 is allotted the switching on and tariff selection function, i.e. with T1 the device is switchable from FREE to OCCUPIED and in sequence to tariff level I to IV, CASHIER, back into the FREE position. In the standard program for tax operation and in the occupied state, the second tariff selection key T2 makes possible a reverse switching within the tariff levels from IV to I. A series of additional functions are also assignable to the key T2 in accordance with the program structure. For the sake of completeness it is noted that in the tax operation the key T3 can, for example, be allotted the adding up function of fare and extra charges and an input and adding up of extra charges, as well as their display in a particular display field 24 for extra charges in the face display 10, can be carried out with the key T4 by means of actuation in series. In order to identify numerical data appearing in the display 10, a face plate 25 is inserted which indicates the significance of the figures and symbols, appearing in the assigned display field 24, 26 to 29, with verbal data 24, 26, 27, 28, 29. Pos. 24 indicates the field for an extra charge, pos. 26 indicates the field for the indication of the fare in German marks, field 27 designates the selected tariff level with an allocation sentinel, field 28 designates the CASHIER function position, field 29 designates the FREE function position. The fare display 10 is constructed as a LC display and there are, for example, six decimal places integrated for the fare, four decimal places integrated for the extra charge, and one decimal place integrated for the tariff level display so as to be fixed in a manner specific to the clientele. A flag 30 is integrated in the field 27, in addition to the numerical designation, as an allocation sentinel for the tariff level designation, the flag 30 being constructed as pointer, in the same manner as the flags 31 and 32 in the field 28 for CASHIER and in the field 29 for FREE. According to FIG. 3, the taximeter device is set in tariff level III by means repeatedly of actuating the key T1 in series, which is displayed immediately when the last completed key actuation is detected. Moreover, after the expiration of the waiting time, the parameter (4.00 DM) assigned to the tariff III as the base amount is activated in the display field 26, which signals the system's acceptance of the last selected tariff level III. In addition, an extra charge, e.g. 2.50 DM, was input by means of actuating the key T4 and is displayed in the field 24.

Figure 2:
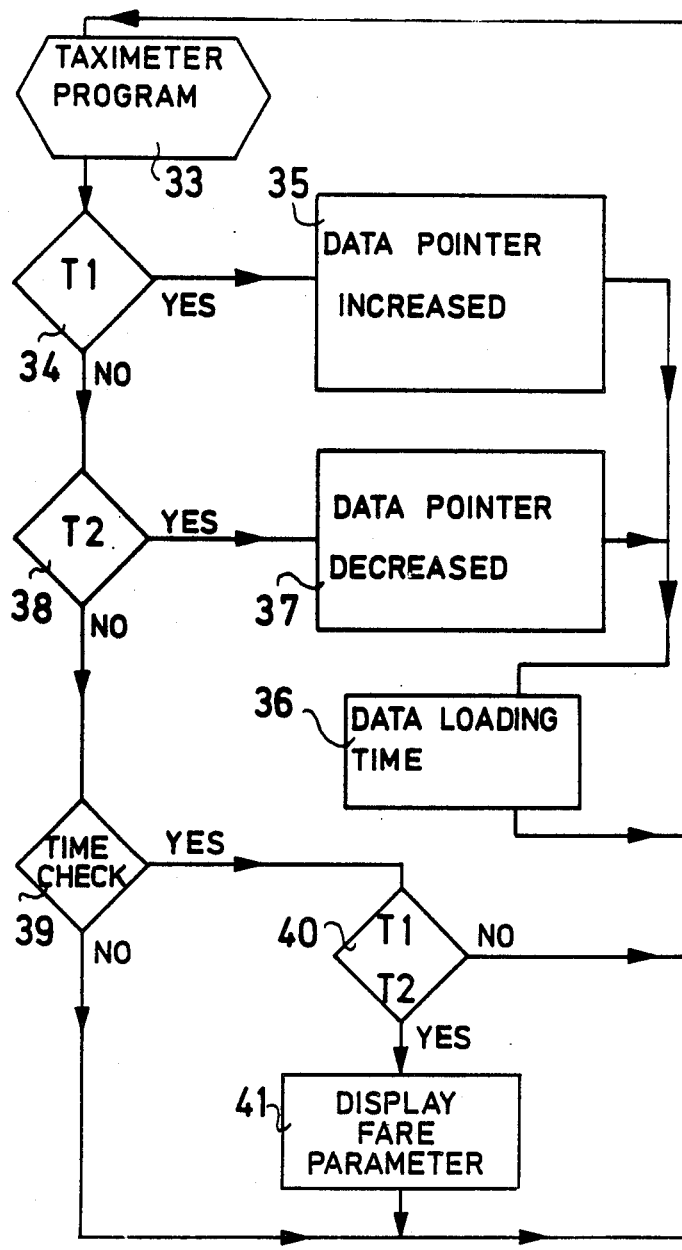
FIG. 2 shows a flowchart of the function cycle which can be carried out with the switching arrangement.

A function cycle of a tariff level selection with the described switching arrangement is shown in schematic form according to FIG. 2 in the form of a flowchart and is effected according to a sub-program in the taximeter program 33, which is filed in the system memory ROM 14. It is assumed that the operator closes a switch 1 via the key T1 (or T2) for the purpose of selecting a tariff level and the taximeter is switched on (in branch 34). The port logic 11 gives the key information to the ALU 16. The program from the ROM 14 runs with the inclusion of the control mechanism 13, the ALU 16, the RAM 15 and the pointer register 18, and detects that key T1 or T2 was actuated and sets a key marker in the RAM 15 for a subsequent testing after the expiration of the waiting time. A program branch results according to or flow chart diagram (FIG. 2) at 34 after 35. After chart pos. 35, a data pointer is increased in the pointer register 18, the allocation number 27/1 of the tariff level display increases correspondingly and is active along with a corresponding allocation sentinel 27 in the display 10. Flag 30 and allocation number 27/1 appear in the field. A predetermined waiting time and dat loading time are then set in the RAM 15. according to chart pos. 36. From there, a reverse jump into the taximeter program is effected in the operating loop after 33.

For the process which now follows, it is assumed that the key T1 or T2 was actuated repeatedly before the expiration of the waiting time and, accordingly, before an acceptance of the tariff parameter is displayed in the field 26. The program cycle is repeated with a corresponding incrementing according to the branch 35 (when T1 is actuated) or decrementing according to branch 37 (when T2 is actuated) of the data pointer in the pointer register 18. However, the waiting time and data loading time is again set in the RAM 15 and begins to run anew consecutively. Again, the reverse jump into the taximeter program 33 follows this.

Finally, a third possible example follows in the running through of the operation loop when the two keys T1, T2 are in the rest position, that is, neither key T1 nor key T2 was actuated again. The port logic 11 supplies the actual key state to the ALU 16. The program detects that none of the keys T1 and T2 was operated again and gates into a branch 39 for the time check. The running time is generated with the time transmitter 7 (FIG. 1) and is connected with a time register or time counter by means of an internal connection via the control mechanism 13, the ALU 16 to the RAM 15. The program tests the time register in the RAM 15 as to whether a time was set in a previous run-through of the operating loop according to chart pos. 36. If a set time is not expired on the basis of the time check a reverse jump into the taximeter program chart pos. 33 is effected after branch 39.

If a set time is expired, then the program branches into the key marker check 40, as indicated in the flow-chart according to FIG. 2, and tests whether a key marker was set in the RAM 5 at the beginning of a previous operating loop on the basis of the detected actuation of a key T1 or T2. If a key marker was set then the latter is set back and acknowledged and, according to chart pos. 41, a data processing, which can be initiated with the respective key, is introduced, i.e. a processing is effected with respect to the assignable parameters in cooperation with informations and addresses prepared in the RAM 15 or 17 and in the pointer register 18. Consecutively, the display of fare parameters, the base amount in the present example, appears in the field 26 of the display (LC display) 10 from the RAM via the display driver 19. The display of a parameter signalizes the acceptance of the selected tariff level and the beginning of a fare calculation according to the instructions of the taximeter program.

Finally, it remains to be explained that if a key marker was not set a reverse jump into the taximeter program is effected again from the branch 40 for the key marker control. This can be the case when, for example, the time has been expired already for a longer period of time or the key marker was already extinguished in the meantime.

What is claimed is:

1. An arrangement in a taximeter for switching on a selected one of n tariff levels having different parameters, n being an integer, said parameters including a base level and factors for determining an appropriate fare, said taximeter comprising keys for respectively incrementing and decrementing through said n tariff levels by repeated actuations of said respective keys, means for determining an appropriate fare using the factors of a selected tariff level, and display means for displaying assignment characteristics designating a selected tariff level, the parameters associated with the selected tariff level, and additional parameters, wherein said arrangement comprises:
   timer means for counting a predetermined waiting time upon actuation of one of said keys; and
   means responsive to said timer means, for preventing said display means for displaying the parameters of a selected tariff level until said waiting time has been counted.

2. An arrangement as claimed in claim 1, wherein said timer means is restarted upon each actuation of said keys.

3. An arrangement as claimed in claim 2, wherein said preventing means further prevents said determining means from using said factors until said waiting time has been counted.

4. An arrangement as claimed in claim 2, wherein said assignment characteristics correspond to an identifying number assigned to the selected tariff level.

5. An arrangement as claimed in claim 2, wherein a tariff selection process is terminated upon incrementing past the n-th tariff level.

* * * * *